United States Patent
Kelm et al.

(10) Patent No.: US 9,406,141 B2
(45) Date of Patent: Aug. 2, 2016

(54) SEGMENTATION OF A STRUCTURE

(71) Applicant: SIEMENS AKTIENGESELLSCHAFT, Munich (DE)

(72) Inventors: Michael Kelm, Erlangen (DE); Felix Lugauer, Erlangen (DE); Jingdan Zhang, Bellevue, WA (US); Yefeng Zheng, Dayton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 71 days.

(21) Appl. No.: 14/148,759

(22) Filed: Jan. 7, 2014

(65) Prior Publication Data

US 2014/0355854 A1 Dec. 4, 2014

Related U.S. Application Data

(60) Provisional application No. 61/829,661, filed on May 31, 2013.

(51) Int. Cl.
 *G06K 9/00* (2006.01)
 *G06T 7/00* (2006.01)
(52) U.S. Cl.
 CPC .............. *G06T 7/0083* (2013.01); *G06T 7/0087* (2013.01); *G06T 7/0089* (2013.01); *G06T 2207/10072* (2013.01); *G06T 2207/20168* (2013.01); *G06T 2207/30101* (2013.01)
(58) Field of Classification Search
 None
 See application file for complete search history.

(56) References Cited

U.S. PATENT DOCUMENTS

| 5,881,124 A * | 3/1999 | Giger .................... G06T 7/0012 250/363.04 |
| 6,201,543 B1 * | 3/2001 | O'Donnell ........... G06K 9/6207 345/420 |
| 7,379,572 B2 * | 5/2008 | Yoshida ................ G06T 7/0012 382/128 |
| 2004/0147838 A1 | 7/2004 | Londt et al. |
| 2004/0165756 A1 | 8/2004 | Mielekamp |

(Continued)

OTHER PUBLICATIONS

Ishikawa—Exact Optimization for Markov Random Fields with Convex Priors—2003, IEEE transaction on pattern analysis and machine intelligence vol. 25, No. 10, pp. 1333-1336.*

(Continued)

*Primary Examiner* — Chan Park
*Assistant Examiner* — Iman K Kholdebarin
(74) *Attorney, Agent, or Firm* — Harness, Dickey & Pierce, P.L.C.

(57) ABSTRACT

A method and a segmentation system are disclosed. An embodiment of the method includes providing an image representation of the structure; providing a start surface model, including a mesh with a plurality of vertices connected by edges; defining for each vertex a ray normal to the surface model at the position of the vertex; assigning more than two labels to each vertex, each label representing a candidate position of the vertex on the ray; providing a representation of likelihoods for each candidate position the likelihood referring to whether the candidate position corresponds to a surface point of the structure in the image representation; and defining a first order Markow Random Field with discrete multivariate random variables, the random variables including the labels of the candidate positions and the representation of likelihoods, finding an optimal segmentation of the structure by using an maximum a posteriori estimation in this Markow Random Field.

16 Claims, 9 Drawing Sheets

(56) References Cited

U.S. PATENT DOCUMENTS

| | | | | |
|---|---|---|---|---|
| 2005/0063578 | A1* | 3/2005 | Zhang | G06T 7/0081 382/128 |
| 2005/0254697 | A1* | 11/2005 | Zhang | G06T 7/0081 382/131 |
| 2006/0023927 | A1* | 2/2006 | Zhang | G06T 7/0081 382/131 |
| 2006/0120585 | A1* | 6/2006 | Zhang | G06T 7/0012 382/131 |
| 2007/0058865 | A1* | 3/2007 | Li | G06K 9/4638 382/173 |
| 2007/0086637 | A1* | 4/2007 | Zhang | G06T 7/0012 382/131 |
| 2007/0248250 | A1 | 10/2007 | Gulsun et al. | |
| 2008/0002870 | A1* | 1/2008 | Farag | G06K 9/0014 382/128 |
| 2008/0101667 | A1 | 5/2008 | Begelman et al. | |
| 2008/0317308 | A1* | 12/2008 | Wu | G06K 9/4638 382/128 |
| 2009/0136103 | A1* | 5/2009 | Sonka | G06K 9/4638 382/128 |
| 2009/0226057 | A1* | 9/2009 | Mashiach | G06T 5/008 382/128 |
| 2010/0092053 | A1 | 4/2010 | Manabe et al. | |
| 2014/0003696 | A1* | 1/2014 | Taghva | A61B 5/0037 382/131 |
| 2014/0355850 | A1* | 12/2014 | Kelm | G06T 7/0083 382/128 |
| 2014/0355854 | A1* | 12/2014 | Kelm | G06T 7/0083 382/131 |
| 2015/0235360 | A1* | 8/2015 | Zheng | G06T 7/0012 382/128 |

OTHER PUBLICATIONS

Zhu et al—Graph-Based Optimization with Tubularity Markov Tree for 3D Vessel Segmentation, Computer Vision and Pattern Recognition (CVPR), 2013 IEEE Conference, Jun. 23-28, 2013.*

Cemil Kirbas et al—A review of Vessel extraction techniques and algorithms, 2003, Vision Interfaces and Systems Laboratory (VISLab).*

Zheng et al.: Model-Given Centerline Extraction for Severely Occluded Major Coronary Arteries. In: Machine Learning in Medical Imaging. 2012. pp. 10 to 18.

Wesarg S. et al: Localizing Calcifications in Cardiac CT Data Sets Using a New Vessel Segmentation Approach; Journal of Digital Imaging, vol. 19; No. 3; pp. 249-257; XP019388047; ISSN: 1618-727X; DOI 0.1007/S10278-006-9947-6; Jun. 7, 2006.

Wesarg S. et al: Segmentation of vessels: the corkscrew algorithm; Proceedings of Spie; vol. 5370; pp. 1609-1620; XP055183179; ISSN: 0277-786X; DOI: 10.1117/12.535125; May 12, 2004.

Lesage D.et al: A review of 3D vessel lumen segmentation techniques: Models features and extraction schemes; Medical Image Analysis; Oxford University Press; GB; vol. 13; No. 6; pp. 819-845; XP026718617; ISSN: 1361-8415, DOI:10.1016/J.MEDIA.2009.07.011; Dec. 1, 2009.

Mohr et al: Accurate Lumen Segmentation and Stenosis Detection and Quantification in Coronary CTA; Proceedings of 3D Cardiovascular Imaging: a MICCAI segmentation challenge workshop; XP055183196, Retrieved from the Internet: URL:http://coronary.bigr.nl/stenoses/pdf/Mohr_TMVSE_221.pdf; Oct. 1, 2012.

Kelm B.et al: Detection, Grading and Classification of Coronary Stenoses in Computed Tomography Angiography; in Medical Image Computing and Computer-Assisted Intervention—MICCAI 2011; Springer Verlag; XP055183216; ISBN: 978-3-64-223625-9; vol. 6893, pp. 25-32; DOI:10.1007/978-3-642-23626-6_4; Jan. 1, 2011.

Li K. et al: Optimal Surface Segmentation in Volumetric Images—A Graph—Theoretic Approach; IEEE Transactions on Pattern Analysis and Machine Intelligence; vol. 28; No. 1; pp. 119-134; XP001523355; ISSN: 0162-8828; Jan. 1, 2006.

Lugauer F. et al: Improving Accuracy in Coronary Lumen Segmentation via Explicit Calcium Exclusion; Learning-based Ray Detection and Surface Optimization; Progress in Biomedical Optics and Imaging Spie—International Society for Optical Engineering Bellingham US; vol. 9034; pp. 90343U-90343U; XP060031806; ISSN: 1605-7422, DOI: 10.1117/12.2043238; ISBN: 978-0-8194-9850-2; Mar. 21, 2014.

Extended European Search Report dated May 15, 2013.

Notice of Allowance for corresponding U.S. Appl. No. 14/148,758 mailed Mar. 1, 2016.

* cited by examiner

FIG 9
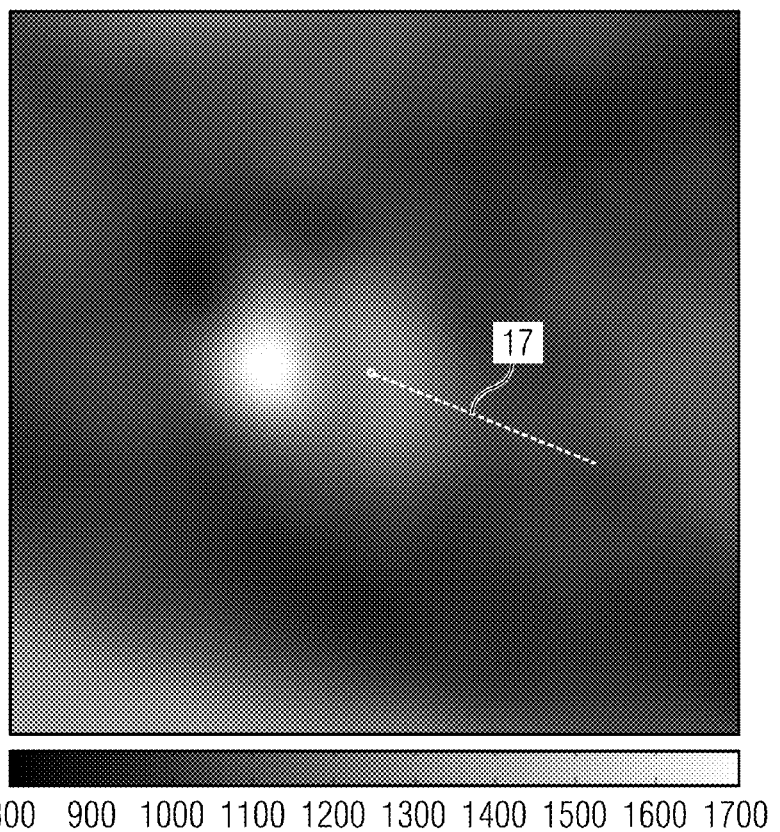
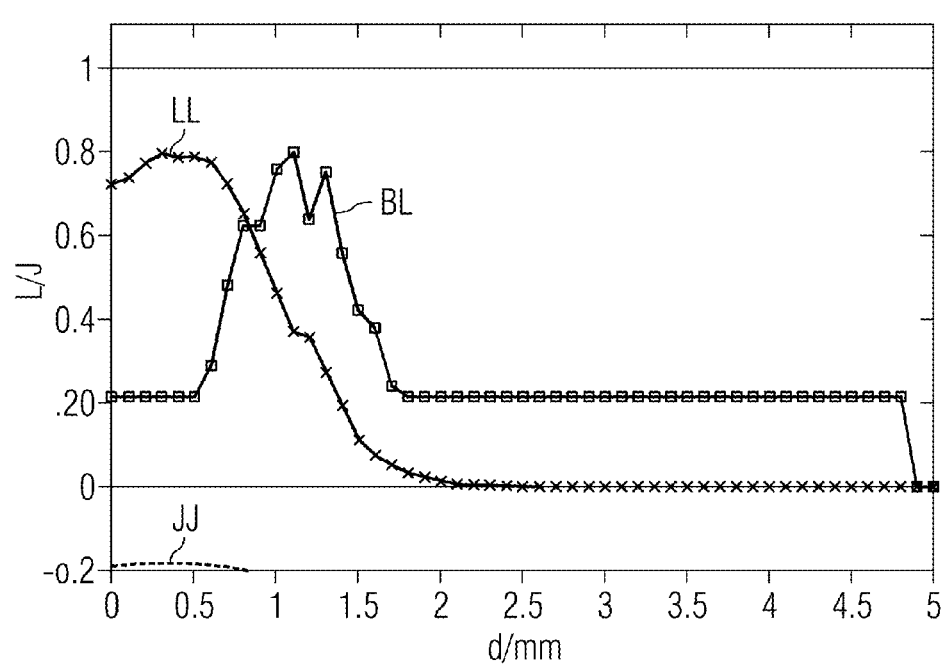

SEGMENTATION OF A STRUCTURE

PRIORITY STATEMENT

The present application hereby claims priority under 35 U.S.C. §119 to U.S. patent application No. 61/829,661 filed May 31, 2013, the entire contents of which are hereby incorporated herein by reference.

FIELD

At least one embodiment of the present invention generally relates to a method for segmentation of a structure, in image data. At least one embodiment of the present invention also generally relates to a segmentation system for that purpose.

An embodiment of the below-described method may generally be used for segmentation of any arbitrary structure in image data, in particular in medical image data such as tomographic image data. A "structure" may thus be generally any object with a bounding surface. A first example from non-medical image data can be considered to involve a segmentation of an object within a larger object, for instance a garment, a bottle or whatever other object in a closed suitcase of which inner image data are taken, e.g. by X-ray.

In medical image data, i.e. image data of a living or dead being (human or animal), structures may in particular refer to organs such as blood vessels or the heart (any many other well-known organs of the body of a living) but also to other structures such as tissue structures, bone structures or the like. Throughout the description below reference is made to blood vessels as a particularly prominent example, which however does not limit the overall scope and applicability of the embodiments of the invention to that purely example application.

BACKGROUND

According to the American Heart Association, coronary artery disease (CAD) is a leading cause of death in the western world. The current diagnostic standard for CAD is conventional invasive angiography (ICA), which involves a considerable amount of risk and cost. New generations of cardiac computed tomography (CT) scanners enable the acquisition of Coronary CT Angiography (CCTA) images with unprecedented quality. Coronary stenoses can be detected with high sensitivity in CCTA which allows that method to be used as a gatekeeper to invasive diagnostic and surgical procedures such as ICA.

Methods for the automatic detection of coronary stenoses in CCTA have been proposed for clinical trials. Recently, CCTA has also been proposed for the simulation of pressure distributions along coronary stenoses and for the computation of the so-called fractional flow reserve (FFR) which is indicative for ischemia-causing lesions. Both an automatic detection of coronary stenoses as well as the simulation of their hemodynamic relevance (i.e. the simulation-based detection of pressure drops within the coronary vessels) rely on accurate segmentation of the coronary lumen in the image data provided. This is a challenging task as coronary vessels are comparatively small (extending to only a few voxels in image data in their distal parts) whereas CCTA image volumes are of varying quality (in particular with relation to noise, artifacts, contrast homogenity etc.). Accurate segmentation is further complicated as the contrast of the vessel lumen is only slightly higher than that of non-calcified plaques but lower than that of calcified plaques. Therefore, non-calcified plaques appear optically very similar to the background of the vessel, in particular in a contrast-enhanced image acquisition process. On the other hand, calcified plaques appear to be part of the lumen of the vessel in such contrast-enhanced image acquisition processes as they show about the same appearance as the contrast agent in the image data. Therefore, a distinction between calcified plaque and lumen of the blood vessel through which blood can flow is very difficult to make.

This explanation shows how important an accurate segmentation of structures can be in the context of the advancement of methodologies of automatic evaluation of illnesses. While numerous segmentation methods for structures in image data do exist already, there still remains the need for particularly accurate segmentation methods and algorithms.

SUMMARY

At least one embodiment of the present invention provides an alternative, preferably improved segmentation method, in particular with reference to blood vessels, but not restricted to the purpose.

A method and a segmentation system are disclosed.

According to at least one embodiment, a method comprises:

a) providing an image representation of the structure. Such image representation may for instance comprise the image data, but also a representation thereof (or both) such as a vesseltree of a (blood) vessel.

b) providing a start surface model, comprising a mesh with a plurality of vertices connected by edges, preferably undirected edges. Such start surface model may already exist before or be computed in the context of the method according to an embodiment of the invention.

c) defining for each vertex of the plurality of vertices a ray normal to the surface model at the position of the (corresponding) vertex.

d) assigning more than two (for instance five) labels to each vertex, each label representing a candidate position of the vertex on the ray. Each of such labels thus corresponds to one candidate position and characterizes that candidate position for instance by indicating a rank of that candidate position along the ray.

e) providing a representation of likelihoods for each candidate position the likelihood referring to whether the candidate position corresponds to a surface point of the structure in the image representation. In this context, the labels of the candidate positions can be used.

f) defining a first order Markow Random Field with discrete multivariate random variables, the random variables comprising the labels of the candidate positions and the representation of likelihoods.

g) finding, i.e. searching and/or identifying an optimal segmentation (such as a segmentation model and/or segmentation mesh) of the structure by using a maximum a posteriori estimation in this Markow Random Field. Thereby, an optimal segmentation is characterized by the fact that the segmentation has a maximum likelihood that the segmentation model represents a true surface of the structure.

According to an embodiment of the invention, a segmentation system comprises:

a) a first provision unit realized to provide an image representation of the structure. This first provision unit corresponds in function with step a) of the method according to an embodiment of the invention. It may be realized as a computation unit which in operation computes the image representation, but may also comprise an input interface for receiving such image representations from other units or modalities outwith (or within) the segmentation system.

b) a second provision unit, which may also be comprised by the first provision unit to form a common provision unit, realized to provide a start surface model, comprising a mesh with a plurality of vertices connected by edges. This second provision unit corresponds in function with step b) of the method according to the invention. It may also be realized as a computation unit which in operation computes the start surface model or again comprise an input interface realized to receive the start surface model from other units or modalities outwith (or within) the segmentation system.

c) a definition unit which in operation defines for each vertex a ray normal to the surface model at the position of the vertex. This definition unit corresponds in function with step c) of the method according to an embodiment of the invention.

d) an assignment unit realized to assign more than two labels to each vertex, each label representing a candidate position of the vertex on the ray. This assignment unit corresponds in function with step d) of the method according to an embodiment of the invention.

e) a third provision unit which in operation provides a representation of likelihoods for each candidate position the likelihood referring to whether the candidate position corresponds to a surface point of the structure in the image representation. The third provision unit, which is preferably realized as a computation unit which in operation computes the representation of likelihoods. It corresponds in function with step e) of the method according to an embodiment of the invention.

f) a definition unit which in operation defines a first order Markow Random Field with discrete multivariate random variables, the random variables comprising the labels of the candidate positions and the representation of likelihoods. The definition unit corresponds in function with step f) of the method according to an embodiment of the invention.

g) a finding unit realized to find an optimal segmentation of the structure by using an maximum a posteriori estimation in this Markow Random Field. The finding unit corresponds in function with step g) of the method according to an embodiment of the invention.

The segmentation system according to an embodiment of the invention, and/or the determination assembly according to an embodiment of the invention, in particular its first and/or second and/or third provision units, the definition unit, the assignment unit, the definition unit, and the finding unit (but also other components of the segmentation system which are mentioned below) may be partially or wholly accomplished by hardware components, for example using semiconductor chips such as ASICs (Application Specific Integrated Circuits), FPGAs (Field Programmable Gate Arrays), or PLAs (Programmable Logic Arrays). They may, however, also be comprised of software components or combinations of hardware and software components. Therefore, an embodiment of the invention also concerns a computer programme product computer programme product directly loadable into a processor of a programmable segmentation system comprising programme code segments to conduct all steps of a method according to an embodiment of the invention when the computer programme product is executed on the segmentation system.

It is further preferred that the likelihood function part is based on a pre-given boundary likelihood of the image representation of the structure provided in step a). Such boundary likelihood can be derived using all different kinds of likelihood determination algorithms such as functions of image gradients. A preferred one is obtained from a trained boundary classifier. A particularly preferred one in the context of the segmentation of blood vessels comprises a method whereby the boundary likelihood is a corrected boundary likelihood derived by the steps of:
providing a vesseltree representation of the blood vessel,
providing a number of preliminary boundary likelihoods of a number of cross-sections of the blood vessel,
providing a number of intensity profiles in the image data in the number of cross-sections,
determining a calcification in the cross-section based on the intensity profile,
correcting each prelimiary boundary likelihood into the corrected boundary likelihood which excludes the calcification from an inner part of the blood vessel.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention. They are not necessarily drawn to scale.

FIG. 9 shows a cross-sectional image of a blood vessel with corresponding first curves for the detection of calcified plaque in the context of the process of FIG. 1.

DETAILED DESCRIPTION OF THE EXAMPLE EMBODIMENTS

Figure 1:
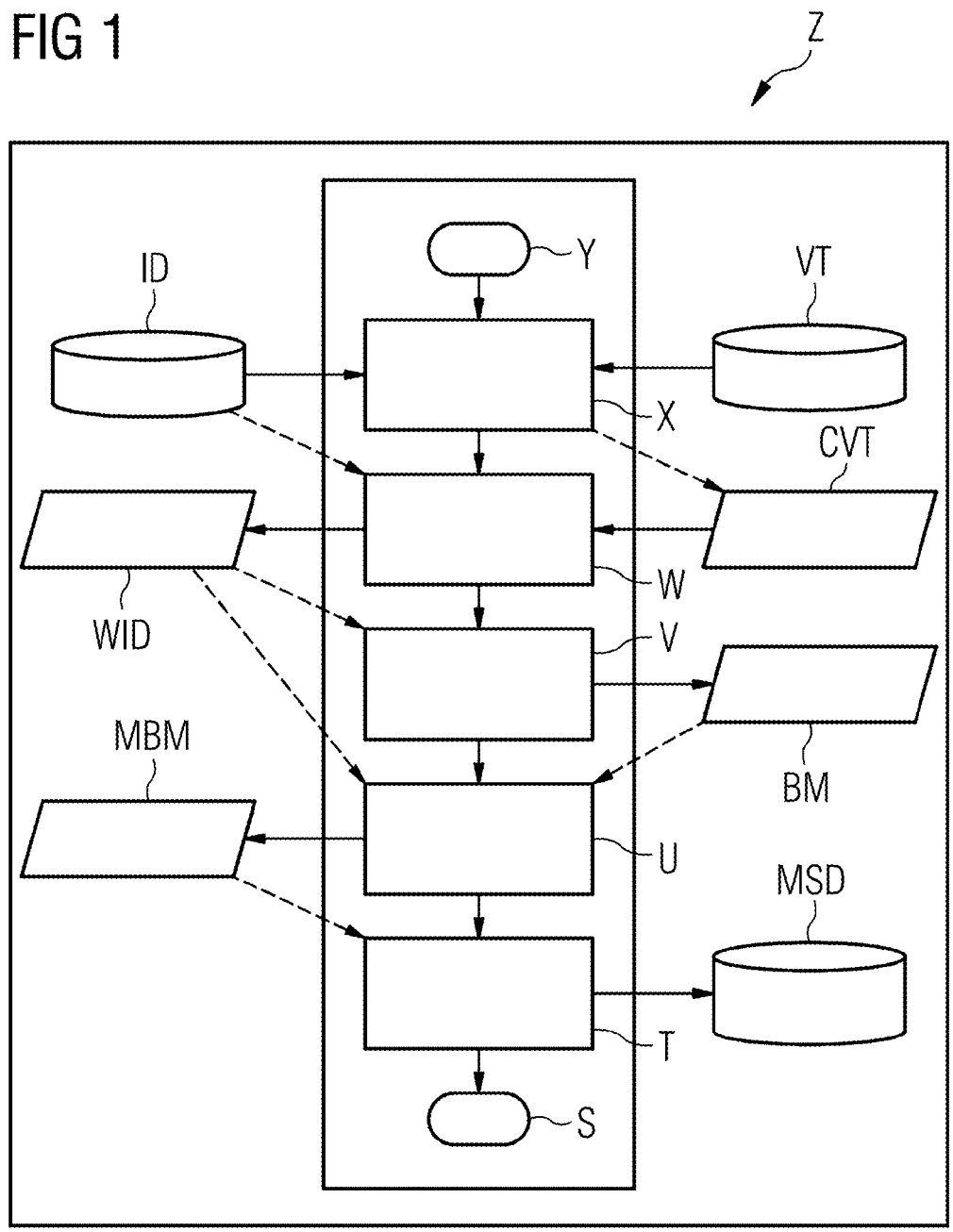
FIG. 1 shows a schematic block diagramme of a segmentation process according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to at least one embodiment, a method comprises:
a) providing an image representation of the structure. Such image representation may for instance comprise the image data, but also a representation thereof (or both) such as a vesseltree of a (blood) vessel.
b) providing a start surface model, comprising a mesh with a plurality of vertices connected by edges, preferably undirected edges. Such start surface model may already exist before or be computed in the context of the method according to an embodiment of the invention.
c) defining for each vertex of the plurality of vertices a ray normal to the surface model at the position of the (corresponding) vertex.
d) assigning more than two (for instance five) labels to each vertex, each label representing a candidate position of the vertex on the ray. Each of such labels thus corresponds to one candidate position and characterizes that candidate position for instance by indicating a rank of that candidate position along the ray.
e) providing a representation of likelihoods for each candidate position the likelihood referring to whether the candidate position corresponds to a surface point of the structure in the image representation. In this context, the labels of the candidate positions can be used.
f) defining a first order Markow Random Field with discrete multivariate random variables, the random variables comprising the labels of the candidate positions and the representation of likelihoods.
g) finding, i.e. searching and/or identifying an optimal segmentation (such as a segmentation model and/or segmentation mesh) of the structure by using a maximum a posteriori estimation in this Markow Random Field. Thereby, an optimal segmentation is characterized by the fact that the segmentation has a maximum likelihood that the segmentation model represents a true surface of the structure.

In this context, the term "structure" refers in particular to an organ, preferably a tubular (hollow) organ, most preferred to a blood vessel. The image data are preferably tomographic image data.

According to an embodiment of the invention, a segmentation system comprises:
a) a first provision unit realized to provide an image representation of the structure. This first provision unit corresponds in function with step a) of the method according to an embodiment of the invention. It may be realized as a computation unit which in operation computes the image representation, but may also comprise an input interface for receiving such image representations from other units or modalities outwith (or within) the segmentation system.
b) a second provision unit, which may also be comprised by the first provision unit to form a common provision unit, realized to provide a start surface model, comprising a mesh with a plurality of vertices connected by edges. This second provision unit corresponds in function with step b) of the method according to the invention. It may also be realized as a computation unit which in operation computes the start surface model or again comprise an input interface realized to receive the start surface model from other units or modalities outwith (or within) the segmentation system.
c) a definition unit which in operation defines for each vertex a ray normal to the surface model at the position of the vertex. This definition unit corresponds in function with step c) of the method according to an embodiment of the invention.
d) an assignment unit realized to assign more than two labels to each vertex, each label representing a candidate position of the vertex on the ray. This assignment unit corresponds in function with step d) of the method according to an embodiment of the invention.
e) a third provision unit which in operation provides a representation of likelihoods for each candidate position the likelihood referring to whether the candidate position corresponds to a surface point of the structure in the image representation. The third provision unit, which is preferably realized as a computation unit which in operation computes the representation of likelihoods. It corresponds in function with step e) of the method according to an embodiment of the invention.
f) a definition unit which in operation defines a first order Markow Random Field with discrete multivariate random variables, the random variables comprising the labels of the candidate positions and the representation of likelihoods. The definition unit corresponds in function with step f) of the method according to an embodiment of the invention.
g) a finding unit realized to find an optimal segmentation of the structure by using an maximum a posteriori estimation in this Markow Random Field. The finding unit corresponds in function with step g) of the method according to an embodiment of the invention.

Further, an embodiment of the invention concerns an imaging device with an acquisition unit and a segmentation system according to an embodiment of the invention.

The segmentation system according to an embodiment of the invention, and/or the determination assembly according to an embodiment of the invention, in particular its first and/or second and/or third provision units, the definition unit, the assignment unit, the definition unit, and the finding unit (but also other components of the segmentation system which are mentioned below) may be partially or wholly accomplished by hardware components, for example using semiconductor chips such as ASICs (Application Specific Integrated Circuits), FPGAs (Field Programmable Gate Arrays), or PLAs (Programmable Logic Arrays). They may, however, also be comprised of software components or combinations of hardware and software components. Therefore, an embodiment of the invention also concerns a computer programme product computer programme product directly loadable into a processor of a programmable segmentation system comprising programme code segments to conduct all steps of a method according to an embodiment of the invention when the computer programme product is executed on the segmentation system.

Particularly advantageous embodiments and features of the invention are given by the dependent claims, as revealed in the following description. Features of different claim categories may be combined as appropriate to give further embodiments not described herein.

Preferably, a max-flow algorithm—also known under the name max-flow/min-cut algorithm—is used in the maximum a posteriori estimation.

Further, it is preferred that a multi-label energy function is minimized for the maximum a posteriori estimation. In this context, it is particularly preferred that the multi-label energy function comprises a likelihood function part (preferably a summand in the multi-label energy function) representing a sum of all likelihoods for the different vertices and their labels of their candidate positions and/or the multi-label energy function comprises a smoothness function part (e.g. again a summand) representing a smoothness of the segmentation (in particular of a mesh model). Thereby, the smoothness function part comprises a sum, for all edges, over function values of a convex function, which convex function depends on a label difference of the (in particular neighbouring) labels connected by each edge.

Such smoothness function part preferably comprises an edge dependent weighting factor. Such edge dependent weighting factor thus depends on the edge(s) and in particular on a length of an edge, i.e. on a distance between those vertices which are interconnected by the edge and/or which depends on a type of the edge. For instance, when the edge can be considered to be within a structure to be segmented, other weighting factors can be assigned to it than if it is considered to be aligned along the surface of the structure, in particular of a blood vessel.

It is further preferred that the likelihood function part is based on a pre-given boundary likelihood of the image representation of the structure provided in step a). Such boundary likelihood can be derived using all different kinds of likelihood determination algorithms such as functions of image gradients. A preferred one is obtained from a trained boundary classifier. A particularly preferred one in the context of the segmentation of blood vessels comprises a method whereby the boundary likelihood is a corrected boundary likelihood derived by the steps of:
  providing a vesseltree representation of the blood vessel,
  providing a number of preliminary boundary likelihoods of a number of cross-sections of the blood vessel,
  providing a number of intensity profiles in the image data in the number of cross-sections,
  determining a calcification in the cross-section based on the intensity profile,
  correcting each preliminary boundary likelihood into the corrected boundary likelihood which excludes the calcification from an inner part of the blood vessel.

Such a method thus provides for a refined boundary likelihood which takes into consideration calcifications within the blood vessel.

The complete example shown by way of the following figures refers to a segmentation of a calcified blood vessel or vesseltree. It is, however, to be understood that the segmentation of different structures, also outwith the medical imaging field, can be carried out using parts of the methodology outlined here. In particular, the calcium exclusion steps certainly only refer to the segmentation of blood vessels, as well as for instance the references to a progession line, especially centerline (which only refers to tubular objects).

The lumen segmentation framework shown here is performed in multiple stages which produce a mesh representation of the lumen surface in a pipe-line like manner. FIG. 1 gives an overview of the framework and visualizes the main control and data flow.

The segmentation Z starts at a starting point Y and has a first step X in which volume data ID, i.e. image data ID and a (for instance previously tracked) vesseltree VT serve as input, whereas the segmented coronary arteries—in a mesh representation i.e. mesh segmentation comprising mesh segmentation data MSD—form the output of this framework at an end point S.

Firstly, the algorithm's input data ID, VT, CVT are preprocessed in a first—optional—vesseltree (in particular centerline) correction step X (which results in a corrected vesseltree CVT) and in a volume warping step W from which there result warped volume data WID. Then, potential lumen wall boundaries are detected in a boundary detection step V along cylindrical coordinates and stored in a boundary map BM. In order to exclude calcified regions from the segmentation, the map is analyzed in step U for the presence of calcium and modified if necessary—which results in a modified boundary map MBM.

At last, in step T, the final segmentation is found by embedding the boundary map as an optimization problem into a multilabel Markov Random Field with convex pair potentials and then solving it by utilizing a standard max-flow/min-cutalgorithm. Thereby, the term volume (image—image data) is used interchangeably with volumetric data.

Step X: Vesseltree Correction

Figure 2:
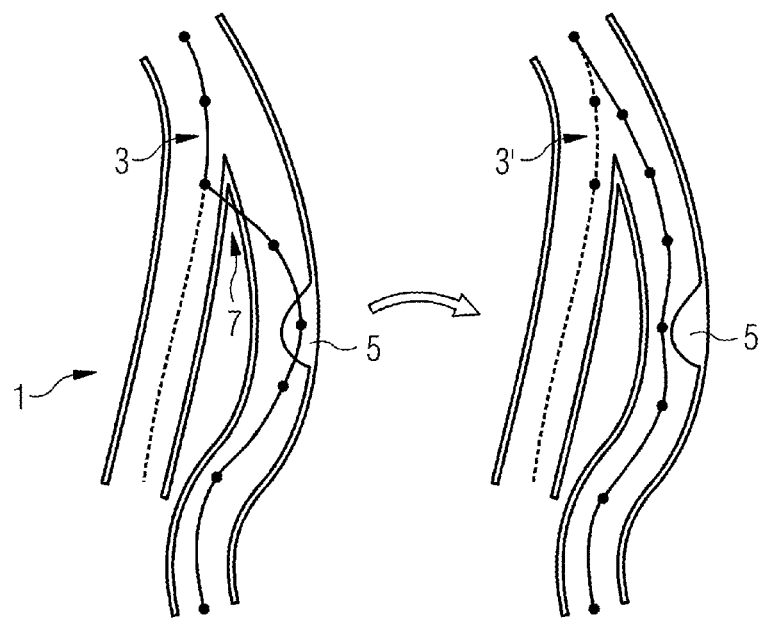
FIG. 2 shows a section view of a blood vessel structure and a progression line thereof in the course of a correction of the progression line according to a step of the process of FIG. 1, FIG. 3 schematically shows different steps of a warping step of the process of FIG. 1.

The correction of the vesseltree generally concerns the correction of its progression line, more particularly its centerline, which is shown with reference to FIG. 2:

The lumen segmentation quality highly depends on the accuracy of the extracted vesseltree progression line of the blood vessel 1, here a centerline 3 (left). Such centerline 3 can be computed using any available progression line (centerline) generating algorithm of which there are numerous available.

The overall segmentation algorithm of this example includes the centerline points in the final lumen segmentation result by default. This is due to the ray-casting method (cf. below) that samples potential boundary positions at radial distances from the centerline point. In an ideal case the extracted vesseltree would always travel along points at the center of the lumen. In practice though, the extracted vesseltree of coronary arteries can lack accuracy and branch falsely, especially at regions with plaque 5 and severe occlusions. Furthermore, at furcations 7 it is possible that the centerline 3 follows a short-cut rather the real lumen position (cf. FIG. 2 left). A repositioning of the points that assemble the vesseltree (cf. FIG. 2 right) can ensure that the corrected centerline 3' runs always distant from the lumen wall, even in the presence of severe lesions. The centerline correction X can be performed with methods provided by Zheng et al.: Model-Given Centerline Extraction for Severely Occluded Major Coronary Arteries. In: Machine Learning in Medical Imaging. 2012. pp. 10 to 18. The algorithm in this reference also provides an estimate of the lumen intensity distribution (or lumen likelihood). This allows for any image voxel of the image data to map from its intensity to the likelihood of being within the vessel lumen.

As a result of the vesseltree correction step X the corrected centerline 3' (at least roughly—i.e. approximately) goes through the lumen centre of the blood vessel 1 and avoids to hit calcified plaques 3.

Step W: Volume Warping

Figure 3:
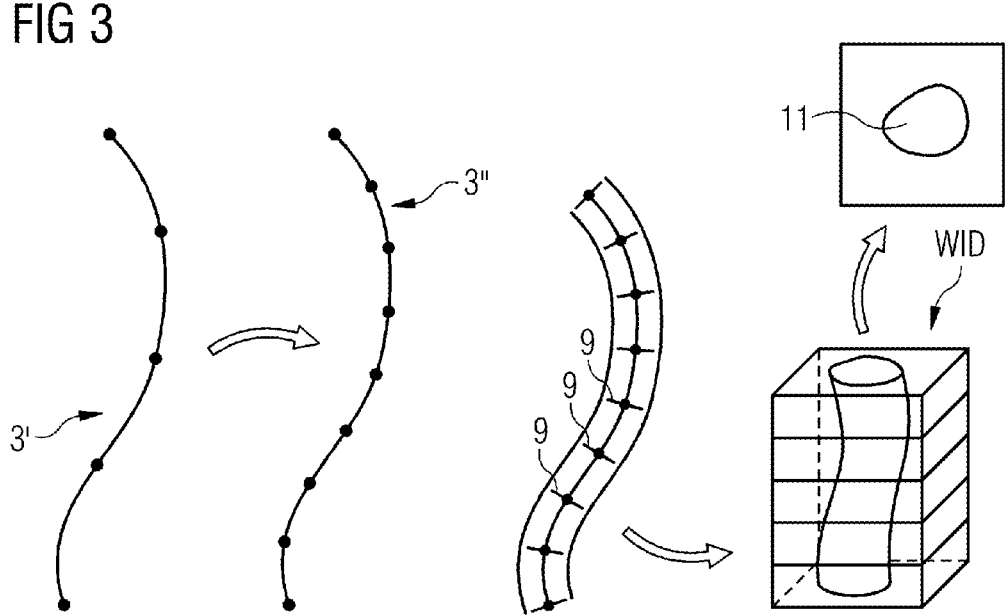

Step W is explained with reference to FIG. 3. Thereby, a warped and resampled version of the volumetric input image data ID is generated.

Since the lumen boundary of the blood vessel 1 has to be determined exactly at those parts of the volume of the image data ID where the extracted centerline 3, 3' runs, a particular focus is given to those regions in particular. These regions are determined by centerline segments which are generated by splitting the (optionally corrected) centerline 3, 3' at furcation points.

In order to get a homogeneous slice distance and to thus avoid image distortion, the centerline 3' is first resampled into a resampled centerline 3" of a certain resolution (e.g. 0.1 mm) using, for instance a bicubic spline interpolation.

Then, for each point of the resampled centerline 3", orthogonal cross-sections 9 (slices 9) of the volumetric data are extracted by cutting them with a plane that is centered on that point and spans perpendicular to the centerline direction of the resampled centerline 3". That means that for each centerline point of the resampled centerline, an image slice 9 orthogonal to the resampled centerline 3" is interpolated with bi-linear interpolation at positions between voxels.

These slices 9 are stored in a volume by parallelly stacking one on top of the other, which produces the warped volume data WID or warped image data WID. The size of each slice is preferably adjusted to the maximum expected size of the extracted structure, i.e. it should at least cover an area which is big enough to show a cross-section 11 through the blood vessel 1 with maximum diameter of the blood vessel 1. Since the diameter of coronary arteries does not exceed about 10 mm in size, the plane of interest in such case can safely be restricted to a size of 15 mm by 15 mm. If other blood vessels are segmented, larger sizes may be applied accordingly.

As a result of the warping step W, the (resampled) centerline 3" is a straight line in the warped image space and runs through the centre of each slice of the warped volume data WID. An advantage of this transformation (warping) step W is that the lumen segmentation can now be performed in a cylindrical coordinate system which is particularly suitable for tubular structures such as blood vessels.

Step V: Boundary Detection

The goal of the boundary detection step is to determine a (preliminary) boundary that separates the lumen of the blood vessel inside from its wall at each slice in the warped volume. To accomplish that, one first needs to find candidates at potential boundary positions and evaluate their suitability. In other words, boundary point candidates are generated and assigned a likelihood value.

Figure 4:
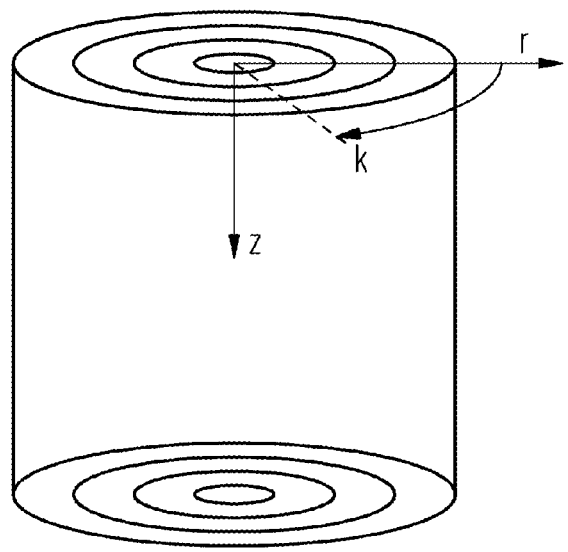
FIG. 4 shows a tubular coordinate system which can be used in the context of the process of FIG. 1.
Figure 5:
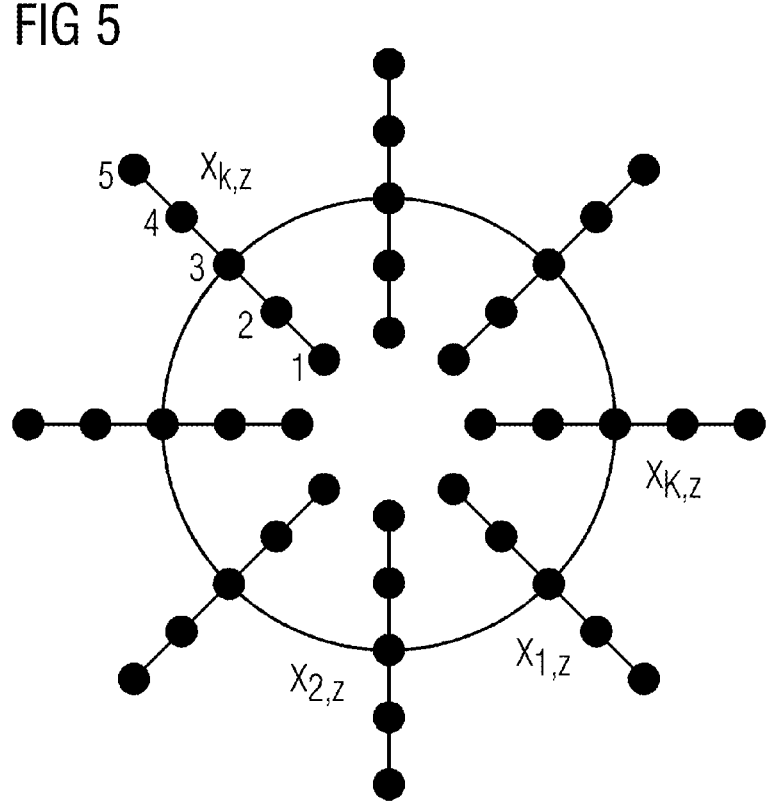
FIG. 5 shows a schematic representation of a slice within the coordinate system of FIG. 4.

It is advantageous to search for the lumen wall in polar, respectively cylindrical, coordinates instead of using a Cartesian coordinate system because the detection of the lumen contour is reduced to a number of searches along a onedimensional ray. Such cylindrical coordinate system is depicted in FIG. 4. Thereby, the height of a slice 9 in the warped volume is expressed by the coordinate z, whereas the angle k and the radial distance r determine a point in the cross-sectional plane (i.e. slice 9) in polar coordinates.

The following procedure is also known as a ray-casting method: considering the center of a slice—being the lumen center—to be a pole, a dense radial sampling around the lumen center becomes feasible using a small parameter space.

Figure 6:
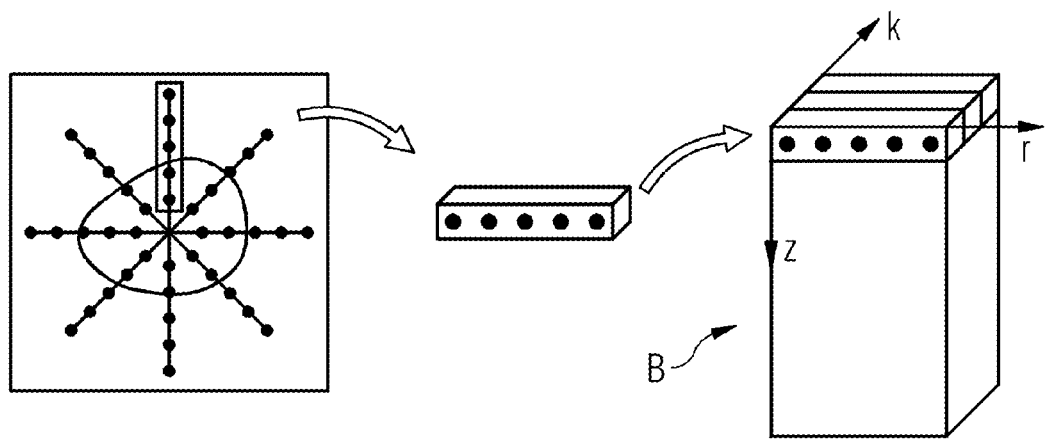
FIG. 6 shows a schematic depiction of the construction of a boundary map in the context of the process of FIG. 1.

FIG. 6 shows boundary candidate points generated for an equidistant selection of slices $z \in [1,Z]$ of the warped volume, for instance for every slice or for every fifth slice (depending on the desired accuracy). In each such slice R points (here: 5 points) along K rays are generated. Each of the points is thus defined by the slice, the angle k and the position 1 to 5 along its ray.

Each of such generated candidate boundary point is then evaluated for its likelihood to lie on the lumen boundary of the blood vessel. For that purpose different well-established models and methods are applicable such as the weighted intensity differences method, the gradient magnitudes method or probability determination method based on previously trained classifier algorithms such as random forest or probabilistic boosting tree algorithms. It is expected that they yield a higher likelihood score at positions that are close to the lumen boundary. One can expect this boundary likelihood to be expressed as a scalar between 0 and 1. For convenience, the obtained likelihood values of the candidate boundary points can be stored in a volume l (k, z, r) of dimension K×Z×R, the boundary map B, as depicted in FIG. 6.

Each element in the boundary map should be a nonnegative value, that yields only high values at positions close to the true lumen wall. One can hereby make use of the fact that tissue inside the lumen has a higher intensity (e.g. HU−) value than outside the wall. That means, e.g. a large positive forward-difference calculated at successive positions along a ray can be used to indicate a boundary. There are now a number of possibilities to incorporate this into an algorithm. Two of the most obvious approaches are to either explicitly exploit derivatives to gain a lumen boundary score, or to use them implicitly, more precisely, to let a variety of derivative-features be evaluated by classifiers in a machine learning approach to yield the sought probabilities.

Boundary detection against the background of machine learning is commonly formulated as a binary classification problem. What is needed therefore is some ground truth annotations, for instance from previous manual segmentations supplied in a trained database: a trained classifier is used to predict the probability for a lumen wall being present at each location given a feature sample. In order to train a classifier, a set of correctly-classified observations has to be made available to the classifier such that it can learn the distinguishing characteristics (features) from the observations. This is also referred to as supervised learning. That means, one has to provide two sets of feature data, one being evaluated at the true lumen wall (positive) and the other one being computed distant from the boundary (negative). After the training step, the classifier can be used to predict the boundary probability for any unseen feature sample and can thus be used for evaluation in the herein-described context of boundary likelihood evaluation.

Figure 7:
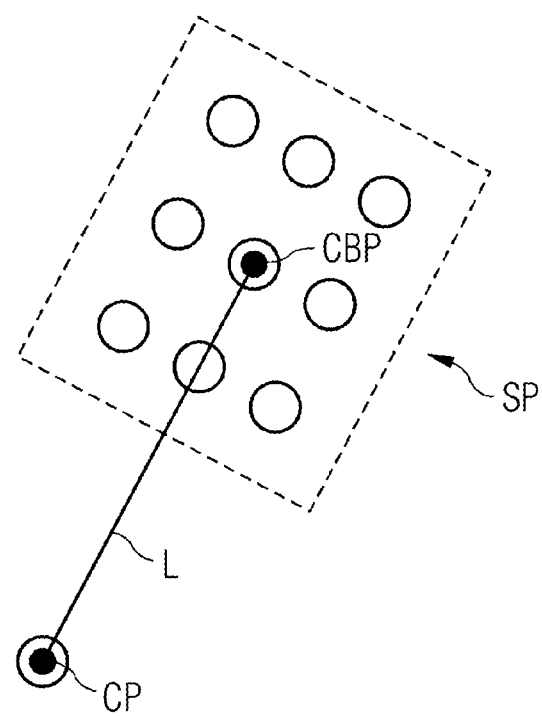
FIG. 7 shows a schematic representation of a feature extraction process in the context of the process of FIG. 1.

For every candidate boundary point at a location (k, z, r) the classifier predicts whether (i.e. with which likelihood or probability) it is part of the lumen boundary of the blood vessel 1 or not. Its prediction is based on low-level image features F(k, z, r) of the image data ID extracted from a local neighbourhood of the boundary candidate point in question, which is described in more detail with reference to FIG. 7:

For each candidate boundary point CBP, an image feature sampling pattern SP is defined based on the point's CBP local orientation determined by the line L connecting the centre point CP of the blood vessel in the corresponding slice 9 and the potential (candidate) boundary point CBP. At each sampling position, low-level image features such as intensity and gradient are then computed. A binary classifier is then trained based on a representative set of manually segmented training data using these features to determine the likelihood/probability of the candidate boundary point CBP being on the blood vessel's boundary. Any binary classifier can be used such as the above-mentioned probabilistic boosting tree or random forest classifiers, which in tests both delivered results of similar high accuracy.

Figure 8:
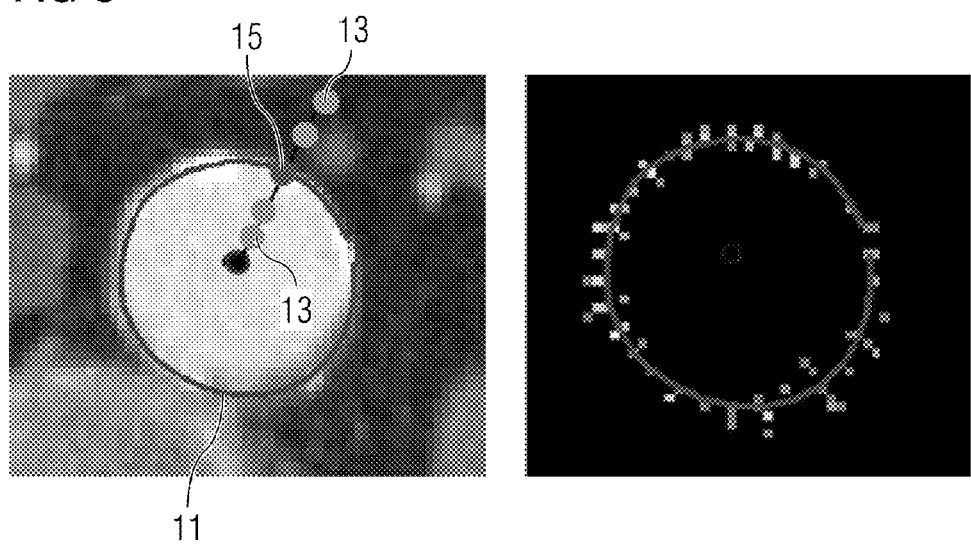
FIG. 8 shows two images of a cross-section of a blood vessel with an annotated boundary map which can be used in the context of the process of FIG. 1.

In training, for each orientation, the intersecting point 15 between the ray and the ground truth annotation 11 is considered as positive and the remaining points 13 on the ray are considered negatives as shown in FIG. 8 (left). FIG. 8 (right) shows the result of a boundary detection process based on the classifier algorithm using the ground truth from the left in the form of a probability map output.

Step U: Calcium Exclusion

For a reliable lumen segmentation the correct handling of calcified plaque is mandatory especially when the boundary detection is in the broadest sense based on image gradients. Due to the fact that calcium in CT images is characterized by high intensity values and is, hence, often similar to intensities captured inside the lumen, it is often erroneously classified as lumen tissue and boundaries are detected between plaque and vessel back-ground rather than lumen and plaque. However, calcified regions in coronary arteries indicate life-threatening stenoses and are per definition not part of the blood-flowed lumen and therefore, have to be excluded from the segmentation results. For that purpose, boundaries are to be detected between (calcified) plaque and the blood vessel lumen rather than between (calcified) plaque and the blood vessel background.

In order to comprehend why calcified plaque is erroneously included in the segmentation, the inventors analyzed the radial profile of intensity, lumen probability and boundary probability values for abnormalities. Their profile exhibits a certain pattern when the corresponding ray is passing through a calcified region instead of a healthy one.

Figure 10:
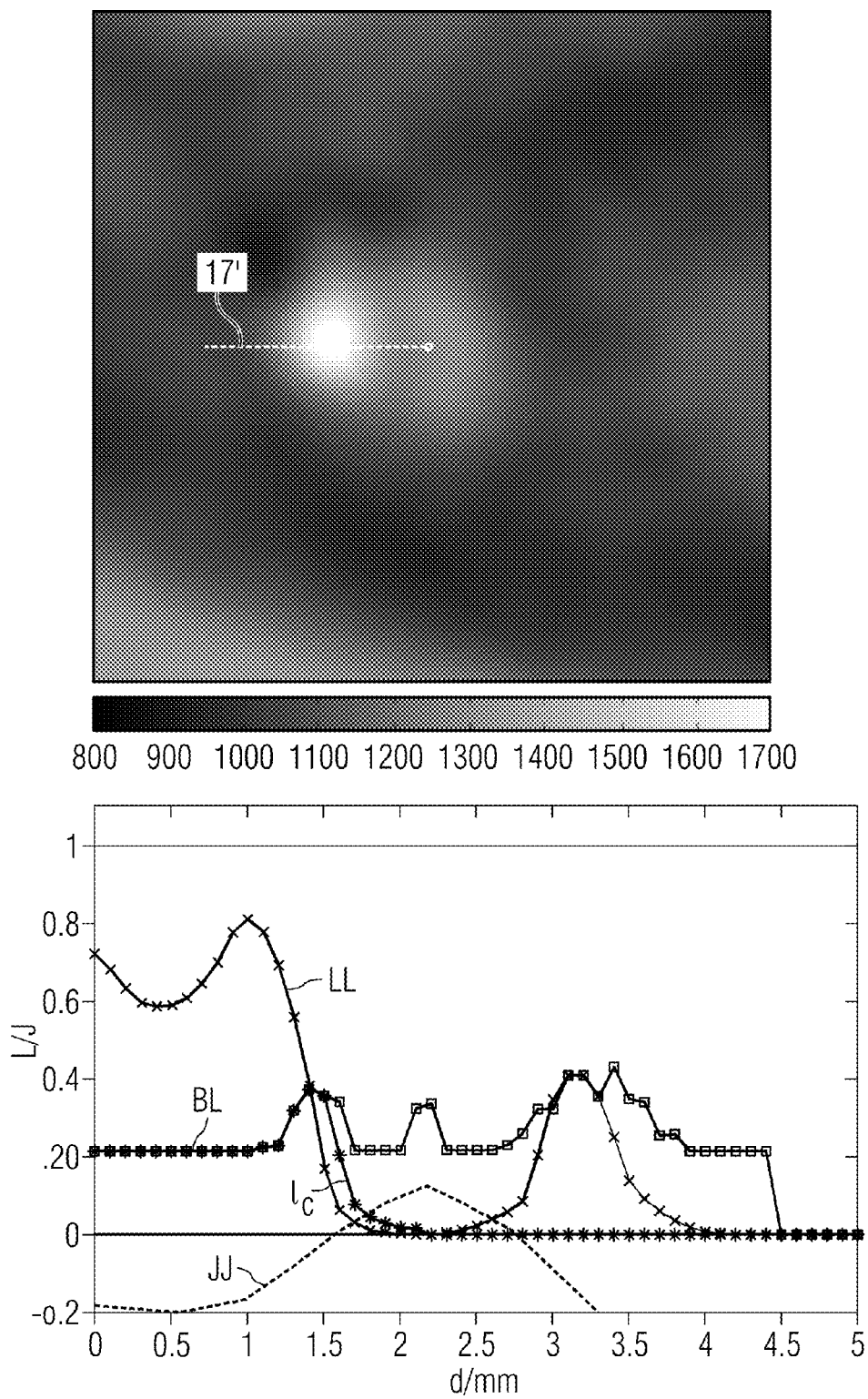
FIG. 10 shows the same cross-sectional image of the blood vessel with corresponding second curves for the detection of calcified plaque in the context of the process of FIG. 1.

FIGS. 9 and 10 show on top the same cross-sectional view of a blood vessel. In FIG. 9 a ray 17 through a healthy part of the blood vessel is shown, whereas in FIG. 10 a ray 17' in a different direction within the same blood vessel passes through calcified plaque which can be distinguished by the lightness of the picture in the region of the plaque. On the bottom diagrammes of the two figures, profiles for the image intensity JJ, the lumen likelihood LL (cf. step X) and the boundary likelihood (cf. step V) have been extracted for a slice and a particular ray at a given angle such as the two different rays 17, 17' in the two figures. The horizontal axis shows a distance d in mm whereas the vertical axis refers to a likelihood L in numbers between 1 and 0 and to an intensity J without numbers given but with a set zero threshold level which corresponds to a CT image intensity of 576 HU As for FIG. 9, the image intensity JJ is always below the set threshold level. Whilst the lumen likelihood from left to right shows a comparatively steady curve downwards to zero, the boundary likelihood shows essentially one peak at about position 1.3 mm.

As for FIG. 10, the image intensity exceeds the set threshold level at about a distance of 1.5 mm, reaching a peak value at about 2.2 mm and going below the set threshold level at about 2.7 mm. The lumen likelihood LL shows two peaks and the boundary likelihood BL shows even three peaks, the leftmost of which corresponds to the true lumen boundary which excludes the calcified plaque. The rightmost peak of the boundary likelihood BL refers to a boundary that erroneously includes the calcified plaque. A corrected boundary likelihood $l_c$ corresponds to the true boundary likelihood which excludes the calcified plaque. This is accomplished in a heuristic approach as follows:

First, the calcified plaque is identified by determining the ranges of the intensity profile that are above a certain predefined threshold, here the set threshold of 576 HU. In order to increase robustness and prevent false responses the threshold can be raised dependent on the current image data by adding to it (or reducing it by) an image data dependent variance (preferably twice such variance), based on lumen intensity distribution (cf. step X). The set threshold $t_{CAL}$ can thus be a chosen constant or an adaptive one using a fixed threshold $t_f$ and the mean lumen intensity $\mu_1$ plus twice its variance $\sigma_1$ so that $$t_{CAL} = \max(t_f, \mu_1 + 2\sigma_1) \tag{1}$$

Figure 11:
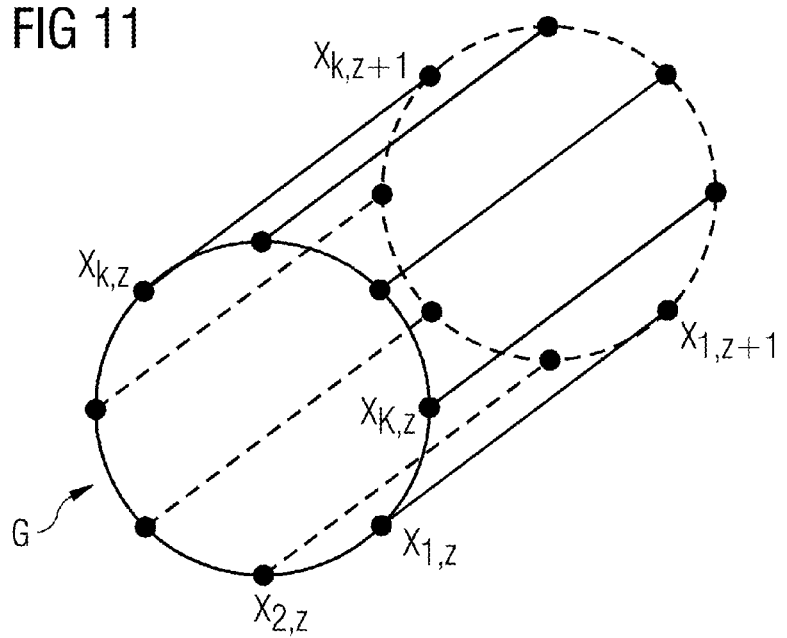
FIG. 11 shows an MRF representation of a blood vessel for use in the context of the process of FIG. 1.

Then, the range along the ray 17' which is closest to the centerline and which preferably has a certain minimum length of e.g. 0.3 mm is regarded as the relevant calcified range. In addition to the index of the starting radius $r_0$ at the centerline point there is also extracted the radius $r_m$ for which the intensity is maximal within the calcified range (that is the peak of the image intensity JJ at about 2.2 mm in FIG. 11). Then, the corrected boundary likelihood $l_c$ along the ray 17' is obtained as $$l_c(k, z, r) = \begin{cases} l(k, z, r) & r < r_0 \\ l(k, z, r) \cdot d_{CAL}^{(r-r_0)/\Delta r} & r_0 \leq r < r_m \\ 0 & r \geq r_m \end{cases} \tag{2}$$

where $\Delta_r$ is the radial sampling resolution (e.g. $\Delta_r = 0.1$ mm) and $d_{CAL}$ is a damping factor which determines the speed of decay of the boundary likelihood profile between $r_0$ and $r_m$. For instance, $d_{CAL}$ can be set as 0.6.

As can be seen in FIG. 10, this strategy leads to a corrected boundary likelihood profile with only one peak which describes a boundary which correctly excludes the calcified plaque.

It may be noted that after the correction of the boundary likelihoods of the blood vessel, it is possible to re-correct the progression line (centerline) as proposed in step X because the lumen of the modelled blood vessel may have changed considerably.

Step T: Segmentation

In the last step, optimal boundaries of the blood vessel are found from the corrected boundary map. In addition to the (corrected) boundary likelihood, 3D smoothness constraints can be considered to avoid unsteady contours and to accomplish a smooth surface. This problem can be formulated in a first order Markov Random Field (MRF) with discrete multivariate random variables. The problem of finding an optimal segmentation can then be regarded as a maximum a posteriori (MAP) estimation in this MRF for which an efficient solver based on the max-flow algorithm has been proposed by Ishikawa, Hiroshi: Exact Optimization for Markov Random Fields with Convex Priors. IEEE Transactions on Pattern Analysis and Machine Intelligence. Vol 25, No. 10, pp. 1333-1336. This reference is explicitly considered part of the teachings of this description.

More formally (cf. FIG. 11), a graph $G=(V,E)$ is defined with a set of vertices V and a set of undirected edges $E \cup V \times V$. A MRF includes a graph G, a finite set of labels $L=\{l_1, \ldots l_R\}$ and a probability distribution P on the space of potential label assignments $X=L^V$ which is the amount of all labels L. Each label thus refers to a (candidate) position along the ray normal to the initial surface model of the blood vessel at the position of the vertex. Thereby, a normal can be considered to be the mean normal of normals of the adjacent mesh surfaces of the position of the vertex.

An element $X \in X$, which can also be considered a configuration, is a map that assigns each vertex v a label $X_v$ in L. As is known from the above reference of Ishikawa, one can effectively minimize multi-label energy functions of the form $$E(X) = \sum_{(u,v) \in E} \gamma_{uv} g(X_u - X_v) + \sum_{v \in V} h(v, X_v) \quad (3)$$

where $g(\cdot)$ is a convex function weighting the label difference of vertex u and vertex v. $\gamma_{uv}$ is a predefined smoothness factor which will be explained below.

The first of the above-given sums can be referred as prior as it is data dependent, whereas the second of these sums can be called a data term as it incorporates the observations (i.e. the boundary likelihood in this case). Energy functions of this form can be converted into an equivalent graph-cut problem which can be solved exactly within polynomial time by a min-cut/max-flow algorithm of which there are several variants available.

The segmentation problem is formulated as an MRF as follows: Each vertex v of the MRF corresponds to a mesh vertex of the tubular mesh (cf. FIG. 11) which is denoted by an angle (or ray number) k and a height z.

Figure 12:
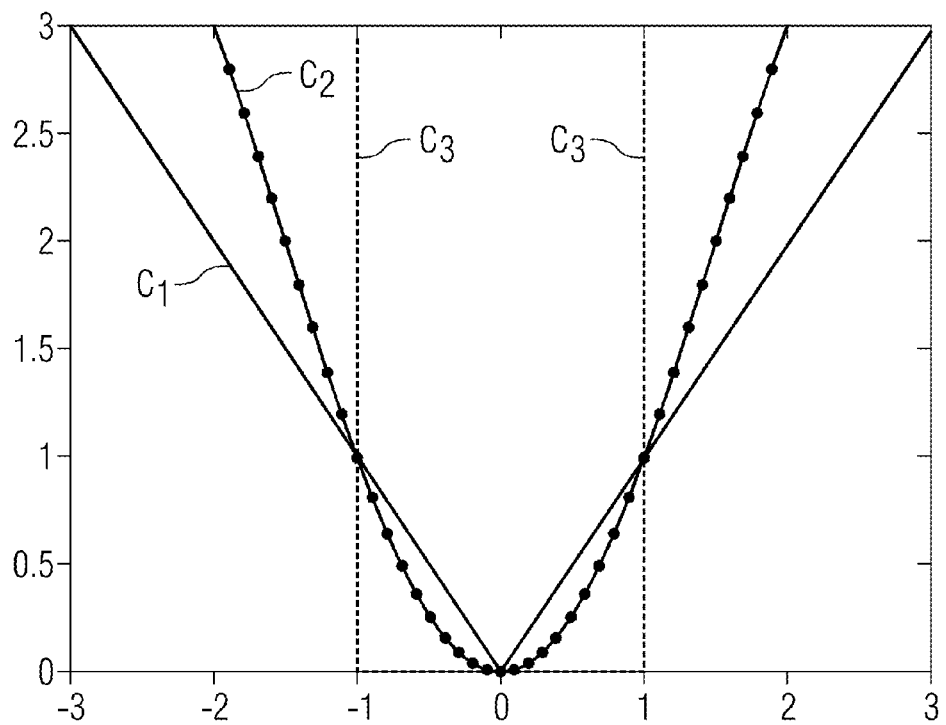
FIG. 12 shows three result curves of convex functions which functions can be used alternatively in the context of the process of FIG. 1.

The associated random variable $X_{k,z}$ is a multivariate, takes an integer value r in the range of [1 . . . R] (corresponding to the label set $L = \{l_1 \ldots l_R\}$) and represents the event that the surface goes through the boundary candidate at height z, and angle k and a radius r. The data term of equation (3) is then defined as $h(v, X_v) = h(X_{k,z}) = -\log(l(r,k,z))$, the negative logarithmic likelihood (negative in order to be able reduce the energy function of equation (3) with increasing likelihood) of the boundary candidates computed on the previous step U. It may be noted in this context that $\log(l(r,k,z))$ may also refer to $\log(l_c(r,k,z))$, i.e. to the corrected boundary likelihood after the calcium exclusion step. While for the prior term (the smoothness term) in equation (3) an arbitrary convex function $g(\cdot)$ can be chosen, three types of functions are particularly well-suited:

$$g(d) = \beta |d| \, (L1 \; norm) \quad (4)$$

$$g(d) = \beta \begin{cases} 0 & |d| \leq \alpha \\ (|d| - \alpha) & |d| > \alpha \end{cases} \, (\varepsilon - \text{insensitive}) \quad (5)$$

$$g(d) = \beta \begin{cases} (d/\alpha) & |d| \leq \alpha \\ 2|d/\alpha| - 1 & |d| > \alpha \end{cases} \, (\text{Huber function}) \quad (6)$$

where $d = X_u - X_v$ is the difference between two integer labels between variables $X_u$ and $X_v$ that are neighbours $U, V \in E_G$ in the MRF graph. The functions are parameterized through a threshold parameter $\alpha$ and a slope parameter $\beta$. The corresponding curves $C_1$ for equation (4), $C_2$ for equation (6) and $C_3$ for equation (5) are depicted in FIG. 12. While equation (6) can be considered to deliver the most precise results, results from equation (4) can be computed fastest and equation (5) lies in the middle between both these functions with respect to speed and precision.

Figure 13:
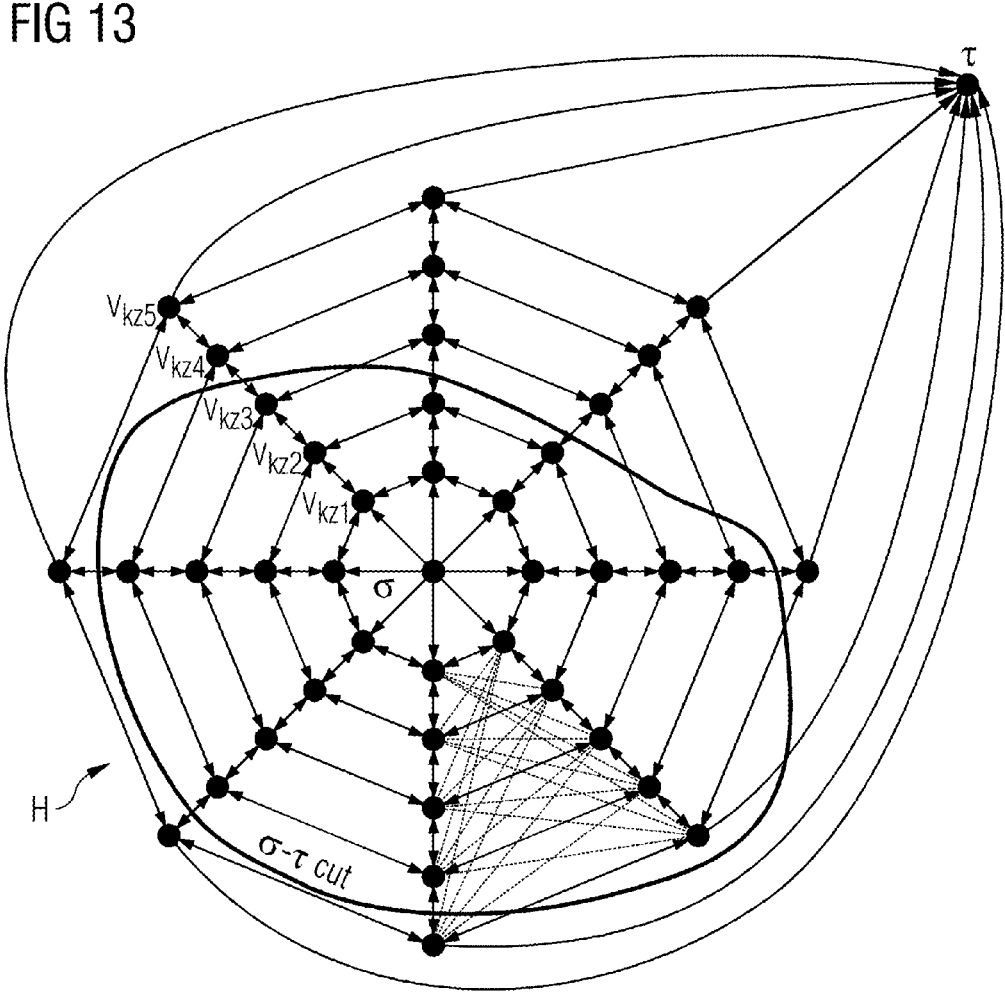
FIG. 13 shows a constructed graph for max-flow analysis in the context of the process of FIG. 1.

Given the MRF represented by the undirected graph G and the defined potentials, a graph-cut problem is formulated for minimizing equation (3). To this end, a directed graph H is constructed with KZR+2 vertices and directed edges $u, v \in E_H$ that are associated with positive capacities $c(u,v) > 0$. The graph is constructed in a way that every $\sigma$–$\tau$ cut in H (i.e. a cut that separates a source $\sigma$ and a sink $\tau$–cf. FIG. 13) corresponds to a configuration (i.e. to a variable assignment) $X \in X$ of the MRF G and the cost of the cut (i.e. the sum of the capacities $c(u,v)$ of the edges of H that are in the cut) is the cost of this configuration according to equation (3) (cf. FIG. 13). Pseudo-code for generating the graph H is provided in algorithms (1), (2), and (3), where H.addCapacity (u, v, a, b) adds the capacities a and b to the two directed edges between u and v, i.e. $c(u,v) = c(u,v) + a$ and $c(v,u) = c(v,u) + b$.

---

Algorithm 1: Graph construction - data term

--- input: boundary map l(k, z, r) of dimension K × Z × R
output: graph H with data term capacities
/* add data terms
for k ← 1 to K do
| for z ← 1 to Z do
|   | H.addCapacity ($\sigma$, $V_{k,z,1}$, ∞, 0) ;
|   |   for r ← 1 to R − 1 do
|   |   | H.addCapacity ($V_{k,z,r}$, $V_{k,z,r+1}$, −log(l(k, z, r)) , ∞);
|   | H.addCapacity ($V_{k,z,R}$, $\tau$, −log(l(k, z, R)), 0)

---

Algorithm 2: Graph construction - smoothness term

--- input: smoothness weight factors $Y_z$ and $Y_k$
parameters: Dimension K, Z, R of the problem
output: graph H with smoothness term capacities
/* add smoothness terms between slices
for k ← 1 to K do
|   for z ← 1 to Z − 1 do
|   | addPairPotential (H, k, z, k, z+1, $Y_z$)
/* add smoothness terms between rays
for z ← 1 to Z do
|   for k ← 1 to K − 1 do
|   | addPairPotential (H, k, z, k+1, z, $Y_k$)
| addPairPotential (H, K, z, 1, z, $Y_k$)

---

Algorithm 3: Graph construction - addPairPotential
(H, $k_0$, $z_0$, $k_1$, $z_1$, Y)

--- input: H, $k_0$, $z_0$, $k_1$, $z_1$, Y
parameters: Dimension K, Z, R of the problem
output: graph H with modified capacities
for d ← 0 to R do
| if c(d)>0 then
|   | c = Y cap(d); /* see equation (7) below */
|   | if d = 0 then
|   |   | c = c/2 /* added twice to the same edge for d = 0 */
|   | for r ← 1 to R−d do
|   |   | H.addCapacity ($V_{k0,z0,r}$, $V_{k1,z1,r+d}$, c, c);
|   |   | H.addCapacity ($V_{k1,z1,r}$, $V_{k0,z0,r+d}$, c, c);
|   | for r ← 1 to d−1 do
|   |   | H.addCapacity ($V_{k0,z0,1}$, $V_{k1,z1,d-r}$, c, c);
|   |   | H.addCapacity ($V_{k1,z1,1}$, $V_{k0,z0,d-r}$, c, c);
|   | for r ← 0 to d−1 do
|   |   | H.addCapacity ($V_{k0,z0,R-r}$, R−r, $\tau$, c, c);
|   |   | H.addCapacity ($V_{k1,z1,R-r}$, R−r, $\tau$, c, c);

---

Besides the two distinguished vertices $\sigma$ and $\tau$, each vertex in H corresponds to a variable assignment $X_{k,z} = r$ and is thus denoted by $V_{k,z,r}$. Capacities representing the data term $$\sum_{v \in V} h(v, X_v)$$

from equation (3) are added to the edges between $V_{k,z,r}$ and $V_{k,z,r+1}$ as H.addCapacity $(V_{k,z,r}, V_{k,z,r+1}, -\log(l(r.k.z)), \infty)$ and to the edges $(\pi, V_{k,z,t})$ and $(V_{k,z,R}, \tau)$ as shown in algorithm (1).

Capacities representing MRF pair potentials $\gamma_{uv} g(X_u - X_v)$ from equation (3) are constructed from each edge from the MRF graph G (cf. algorithm (2)). Between the variables $X_{k,z}$ and $X_{k,z+1}$ of neighbouring slices a smoothness factor $\gamma_{uv} = \gamma_k$ is used. Each pair potential may require to add several capacities to the graph H (cf. algorithm (3)) which are computed as second-order differences from the chosen pair-potential functions (cf. equations (4) to (6)) as $$\text{cap}(d) = \frac{g(d+1) - 2g(d) + g(d-1)}{2} \quad (7)$$

Here, $d = r_1 - r_0$ is the label difference between the connected variables $X_{k1,z1} = r_1$ and $X_{k0,z0} = r_0$, i.e. the vertices $V_{k1,z1,r1}$ and $V_{k0,z0,r0}$ in H. Thereby, cap(d)=0 for label distances d where the pair-potential function g(d) is linear and that for these vertices no edges in H are created. Thus, the resulting graph is sparser for pair-potential functions with linear parts, such as equations (4) to (6), which ultimately results in a faster computation of the min-cut/max-flow solution.

Finally, it needs to be stated that any min-cut/max-flow algorithm can be used to obtain the minimum solution of equation (3) which is the configuration X that corresponds to the minimum cut.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Although the invention has been illustrated and described in detail on the basis of the preferred example embodiment, the invention is not limited by the disclosed examples and other variations can be derived herefrom by the person skilled in the art, without departing from the scope of protection of the invention.

What is claimed is:

1. A method for segmentation of a biological structure, in image data, comprising:
    providing an image representation of the biological structure;
    providing a start surface model, including a mesh with a plurality of vertices connected by edges;
    defining for each vertex a ray normal to the surface model at the position of the vertex;
    assigning more than two labels to each vertex, each label representing a candidate position of the vertex on the ray;

providing a representation of likelihoods for each candidate position, the likelihood referring to whether the candidate position corresponds to a surface point of the biological structure in the image representation;

defining a first order Markov Random Field with discrete multivariate random variables, the random variables including the labels of the candidate positions and the representation of likelihoods; and segmenting the image representation of the biological structure, the segmenting including, determining a selected segmentation of the biological structure using an maximum a posteriori estimation in the Markov Random Field, the selected segmentation representing a true surface of the biological structure.

2. The method of claim 1, wherein a max-flow algorithm is used in the maximum a posteriori estimation.

3. The method of claim 1, wherein a multi-label energy function is minimized for the maximum a posteriori estimation.

4. The method of claim 3, wherein the multi-label energy function comprises a likelihood function part representing a sum of all likelihoods for the different vertices and their labels of their candidate positions.

5. The method of claim 3, wherein the multi-label energy function comprises a smoothness function part representing a smoothness of the segmentation.

6. The method of claim 5, wherein the smoothness function part comprises a sum, for all edges, over function values of a convex function, the convex function depending on a label difference of the labels connected by each edge.

7. The method of claim 5, wherein the smoothness function part comprises an edge dependent weighting factor.

8. The method of claim 4, wherein the likelihood function part is based on a pre-given boundary likelihood of the image representation of the biological structure.

9. The method of claim 5, wherein the likelihood function part is based on a pre-given boundary likelihood of the image representation of the biological structure.

10. The method of claim 8, wherein the biological structure includes at least a calcified blood vessel and the boundary likelihood is a corrected boundary likelihood derived by at least the following:

providing a vesseltree representation of the blood vessel;
providing a number of preliminary boundary likelihoods of a number of cross-sections of the blood vessel;
providing a number of intensity profiles in the image data in the number of cross-sections;
determining a calcification in the cross-section based on the intensity profile; and
correcting each preliminary boundary likelihood into the corrected boundary likelihood which excludes the calcification from an inner part of the blood vessel.

11. The method according to claim 9, wherein the biological structure includes at least a calcified blood vessel and the boundary likelihood is a corrected boundary likelihood derived by at least the following:

providing a vesseltree representation of the blood vessel;
providing a number of preliminary boundary likelihoods of a number of cross-sections of the blood vessel;
providing a number of intensity profiles in the image data in the number of cross-sections;
determining a calcification in the cross-section based on the intensity profile; and
correcting each preliminary boundary likelihood into the corrected boundary likelihood which excludes the calcification from an inner part of the blood vessel.

12. A segmentation system for segmentation of a biological structure, in image data, comprising:

a memory configured to store instructions; and
a processor configured to execute the instructions such that the processor is configured to,
provide an image representation of the biological structure,
provide a start surface model, comprising a mesh with a plurality of vertices connected by edges,
define, for each vertex, a ray normal to the surface model at the position of the vertex,
assign more than two labels to each vertex, each label representing a candidate position of the vertex on the ray,
provide a representation of likelihoods for each candidate position the likelihood referring to whether the candidate position corresponds to a surface point of the biological structure in the image representation,
define a first order Markov Random Field with discrete multivariate random variables, the random variables comprising the labels of the candidate positions and the representation of likelihoods, and
segment the image representation of the biological structure including,
determine a selected segmentation of the biological structure by using an maximum a posteriori estimation in the Markov Random Field, the selected segmentation representing a true surface of the biological structure.

13. A tomographic imaging device comprising:
an acquisition unit; and
the segmentation system of claim 12.

14. A non-transitory computer readable medium including computer readable instructions, when executed by a programmable segmentation system, causing the programmable segmentation system to implement the method of claim 1.

15. A non-transitory computer readable medium including computer readable instructions, when executed by a programmable segmentation system, causing the programmable segmentation system to implement the method of claim 8.

16. A non-transitory computer readable medium including computer readable instructions, when executed by a programmable segmentation system, causing the programmable segmentation system to implement the method of claim 9.

* * * * *